Oct. 25, 1932. K. KLEINERT 1,883,954
SIGNALING DEVICE
Filed July 23, 1930
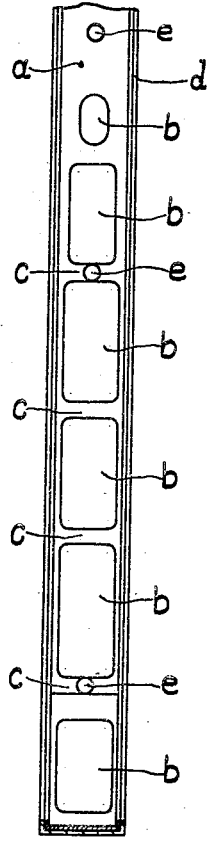
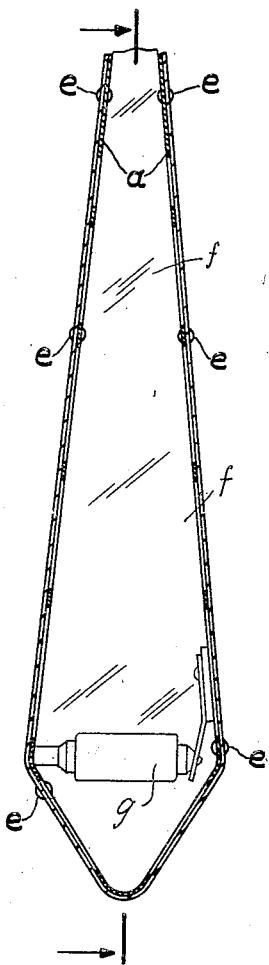
Inventor
Karl Kleinert
by Steward & McKay
his attorneys Patented Oct. 25, 1932

1,883,954

UNITED STATES PATENT OFFICE

KARL KLEINERT, OF STUTTGART, GERMANY, ASSIGNOR TO ROBERT BOSCH AKTIENGESELLSCHAFT, OF STUTTGART, GERMANY

SIGNALING DEVICE

Application filed July 23, 1930, Serial No. 470,205, and in Germany August 7, 1929.

The present invention relates to signaling devices and more particularly to devices for use on road vehicles.

The object of the present invention is to provide a construction which is light and yet is as firm as possible.

With this object in view the invention consists in forming that portion of the frame of the indicator which does not form the signaling surface, of a lattice work covered on the outside with thin sheet metal.

The invention is more particularly described with reference to the accompanying drawing, in which:—

Fig. 1 is a section through a signaling device of the present invention, this section being taken parallel with the front and rear thereof.

Fig. 2 is a section about a plane normal to that of the section of Fig. 1, i. e., it is a section through the signaling device from front to rear thereof.

In the construction according to the drawing the front and rear of the device consist of two transparent plates $f$ of substantially arrow shape, whilst the sides constitute the frame for holding said plates in position. An electric lamp $g$ is mounted within the frame.

This frame consists of a strip $a$ of sheet iron which is bent to conform to the arrow shape of the arm and has a number of perforations $b$ spaced apart and separated by transverse strips $c$. The perforated frame $a$ is covered on the outside by a thin sheet of metal such as aluminium which is secured to the transverse or cross pieces $c$ by means of rivets $e$.

I claim:

1. A signaling device suitable for use on road vehicles comprising a semaphore arm having front and rear faces formed of transparent plates, a perforated frame for holding said plates in spaced relationship, a lamp within said frame, and a covering for said frame consisting of a thin sheet of metal such as aluminium.

2. A signaling device suitable for use on road vehicles comprising a semaphore arm having front and rear faces formed of transparent plates, a perforated frame for holding said plates in spaced relationship, a lamp within said frame, a covering for said frame consisting of a thin sheet of metal such as aluminium, and means for securing said covering to said frame.

3. A signaling device for use on road vehicles comprising a pair of spaced transparent plates substantially in the shape of an arrow and forming the front and rear faces of the device, a frame for supporting said plates and for maintaining them in spaced relationship, a lamp within said frame, said frame consisting of a strip of metal perforated throughout its length with transverse strips separating said perforations, a covering of thin sheet metal such as aluminium, and means to rigidly connect said covering to said strip forming the frame.

In testimony whereof I have hereunto affixed my signature.

KARL KLEINERT.